United States Patent
McConathy et al.

(10) Patent No.: US 10,048,081 B2
(45) Date of Patent: Aug. 14, 2018

(54) METHOD AND SYSTEM FOR ELECTRONIC MONITORING

(71) Applicant: Earthsweep LLC, Cincinnati, OH (US)

(72) Inventors: Nathaniel McConathy, Lexington, KY (US); Brian C. Poe, Lexington, KY (US)

(73) Assignee: Earthsweep LLC, Cincinnati, OH (US)

( * ) Notice: Subject to any disclaimer, the term of this patent is extended or adjusted under 35 U.S.C. 154(b) by 18 days.

(21) Appl. No.: 15/138,294

(22) Filed: Apr. 26, 2016

(65) Prior Publication Data

US 2017/0307388 A1    Oct. 26, 2017

(51) Int. Cl.
*G01C 21/00*    (2006.01)
*G01C 21/34*    (2006.01)

(52) U.S. Cl.
CPC ..... *G01C 21/3461* (2013.01); *G01C 21/3415* (2013.01)

(58) Field of Classification Search
None
See application file for complete search history.

(56) References Cited

U.S. PATENT DOCUMENTS

| | | | | |
|---|---|---|---|---|
| 6,049,753 | A * | 4/2000 | Nimura | G01C 21/3484 701/428 |
| 7,098,795 | B2 * | 8/2006 | Adamczyk | G08B 21/0261 340/539.13 |
| 8,682,356 | B2 * | 3/2014 | Poe | H04W 24/00 455/456.1 |
| 8,718,858 | B2 * | 5/2014 | Al-Mahnna | G01C 21/3602 701/23 |
| 2002/0196151 | A1 * | 12/2002 | Troxler | B65F 1/0033 340/573.1 |
| 2006/0027185 | A1 * | 2/2006 | Troxler | G01C 21/005 119/721 |
| 2006/0089797 | A1 * | 4/2006 | Suzuki | G08G 1/096811 701/431 |
| 2007/0050279 | A1 * | 3/2007 | Huang | G06Q 30/0207 705/14.1 |
| 2008/0088437 | A1 * | 4/2008 | Aninye | G07C 9/00111 340/539.13 |
| 2008/0088438 | A1 * | 4/2008 | Aninye | G07C 9/00111 340/539.13 |
| 2008/0108370 | A1 * | 5/2008 | Aninye | B60R 25/1004 455/456.1 |
| 2008/0109162 | A1 * | 5/2008 | Chen | G01C 21/3415 701/414 |
| 2008/0218335 | A1 * | 9/2008 | Attar | G06Q 10/08 340/539.13 |

(Continued)

*Primary Examiner* — Bhavesh V Amin
(74) *Attorney, Agent, or Firm* — Fish & Richardson P.C.

(57) ABSTRACT

Disclosed is a system that receives a request for calculation of one or more routes between a user specified starting location and a destination location and retrieve restrictions in a list corresponding to one or more location restrictions imposed on an individual, with each restriction including a restriction area. The system receive calculated routes and restrictions and whether the segments of the routes intersect areas that define the restrictions in the list. The system issues an approval for each route where no segment of the route intersects any of the restriction areas. Also disclosed is tracking of a user according to approved routes.

22 Claims, 6 Drawing Sheets

(56) References Cited

U.S. PATENT DOCUMENTS

| | | | |
|---|---|---|---|
| 2008/0246656 A1* | 10/2008 | Ghazarian | G08B 25/016 342/357.54 |
| 2008/0291011 A1* | 11/2008 | Knight | G08B 21/0252 340/539.13 |
| 2009/0002188 A1* | 1/2009 | Greenberg | A01K 15/023 340/686.1 |
| 2009/0212957 A1* | 8/2009 | Burris | A61B 5/1112 340/573.4 |
| 2010/0066545 A1* | 3/2010 | Ghazarian | G08B 21/0258 340/573.4 |
| 2013/0204517 A1* | 8/2013 | Raju | B60R 16/02 701/400 |
| 2014/0136414 A1* | 5/2014 | Abhyanker | G06Q 50/28 705/44 |
| 2014/0180914 A1* | 6/2014 | Abhyanker | G01C 1/00 705/39 |
| 2014/0309864 A1* | 10/2014 | Ricci | H04W 48/04 701/36 |

* cited by examiner

METHOD AND SYSTEM FOR ELECTRONIC MONITORING

BACKGROUND

This disclosure relates generally to the field of electronic monitoring using a portable electronic device.

Current systems that track the geographical location of portable electronic devices make extensive use of cellular networks to transmit Global Positioning System (GPS) data to a remote central database. Tracking is extremely important in law enforcement such as to ensure compliance with lawful orders and constraints on persons' movements and locations such as in monitoring the location of those individuals within the criminal justice system that can pose substantial risks to public safety.

In general, when individuals within the criminal justice system are allowed to leave their homes, the electronic monitoring restrictions that are imposed on such individuals are generally removed during a period of vehicular transportation between two locations.

SUMMARY

When an offender is being monitored via electronic monitoring central monitoring stations collect data about the offenders' locations/activities from tracking devices that are worn by such offenders. However, when an offender is being monitored via electronic monitoring there are situations where it is not feasible to collect data about the offender's location, but nevertheless the offender may have restrictions imposed on the offender's locations.

According to an aspect, a system includes a storage device that stores a list of one or more location restrictions imposed on an individual, which list specifies for each restriction, a corresponding area about the one or more location restrictions within which the individual is restricted from entering, a processor device, memory coupled to the processor device, and a storage device storing a computer program product to configure the processor device to receive from a computer based system one or more calculated routes between a user entered starting location and a destination location, retrieve restrictions from the storage device, compare values of geo coordinates corresponding to segments of the one or more calculated routes to values of geo coordinates corresponding to areas defining the one or more restrictions in the list, determine from the comparison whether one or more segments of the proposed route intersect one or more of the areas defining the restrictions; and when an intersection is determined, cause the computer based system to calculate a new route between the user entered starting location and the destination location.

Aspects also include computer program products, devices and methods.

The following are some embodiments with the scope of one or more aspects.

The system is further configured to issue an approval of one or more calculated routes when the segments of the corresponding one or more calculated routes do not intersect areas defining all of the restrictions. The routes are received as an ordered listing of nodes. The system for each of the routes that is represented as the ordered listing of nodes, produces the segments.

The system receives a user request for approval of a route. The system receives the user request, and the system is configured to send a system generated request to a third party system for calculation of a route between the user entered starting location and a destination location. The system receives the calculated route from the third party system, and the system is configured to send a second request to the third party system for the recalculation of a route between the user entered starting location and a destination location when the received calculated route is determined to have one or more segments that intersect one or more of the areas.

The system receives from a user device a calculated route that accompanies the user request for approval of the calculated route; and the system is configured to send the approval to the user device when the system determines that the received calculated route does not have at least one segment that intersects one or more of the areas. The system receives a calculated route that accompanies the user request for approval of the calculated route; and the system is configured to send a message to the user device to calculate a new route when the system determines that the received calculated route does have at least one segment that intersects one or more of the areas. The system receives a calculated route that accompanies the user request for approval of the calculated route; and the system is configured to calculate an alternative route by the system, which route is determined to be free of any segments that intersect one or more of the areas.

The system, upon initiating of travel by the individual in a vehicle, is further configured to receive from a navigation system in the vehicle, location data collected by the navigation system, determine from the location data whether the user has entered an area associated with the retrieved restrictions and issue an alert to a user device that the vehicle has either deviated from the approved route and/or entered an area associated with the retrieved restrictions. The system wherein the navigation system is an automotive navigation system. Upon initiating of travel by the individual, the system is further configured to receive location data collected by a location data collector associated with a tracking device, determine from the set of location data whether the tracking device has entered an area associated with the retrieved restrictions and issue an alert to a user device that the user has either deviated from the approved route and/or entered an area associated with the retrieved restrictions. The system is further configured to receive the list of the one or more location restrictions, with the list comprising a node expressed in geo coordinates of longitude and latitude and an radius about the node, calculate for each of the one or more location restrictions from the geo coordinates of longitude and latitude and corresponding radius about the node, the area that defines the location restriction, and store the calculated area in association with the restriction.

One or more of the following advantages may be provided by one or more of the above aspects.

Thus, in addition to monitoring of an offender's locations by using an electronic monitoring device carried by the offender to track the offender's location, monitoring can continue in contexts where location monitoring is generally not performed such as during vehicle transport between two locations. A central monitoring facility can receive proposed routes of travel and analyze the routes in order to determine whether the proposed routes of travel will impinge on areas associated with location restrictions imposed on an individual. The central monitoring facility can send approvals of those received proposed routes of travel that avoid areas associated with location restrictions. The individual can use approved routes that are either entered by a user manually or are automatically sent by the tracking system to a navigation system. Either the navigation system and/or the central tracking system can determine when the approved route is not being followed and can issue alerts to either a user and/or authorities.

The details of one or more embodiments of the invention are set forth in the accompanying drawings and the description below. Other features, objects, and advantages of the invention will be apparent from the description and drawings, and from the claims.

BRIEF DESCRIPTIONS OF THE DRAWINGS

The drawings and detailed descriptions which follow are intended to be illustrative and are not intended to imply limitations on the scope of potential implementations of the disclosure set forth herein.

DETAILED DESCRIPTION

Described are techniques for determining and approving travel routes and tracking vehicular transport on these approved routes involving individuals wearing tracking devices using location data such as Global Positioning System (GPS) location data. A remote central monitoring system includes a database that collects location data according to an identification of a tracking device that includes a GPS transceiver. The remote central monitoring system automatically tracks a user wearing/carrying the device.

Figure 1:
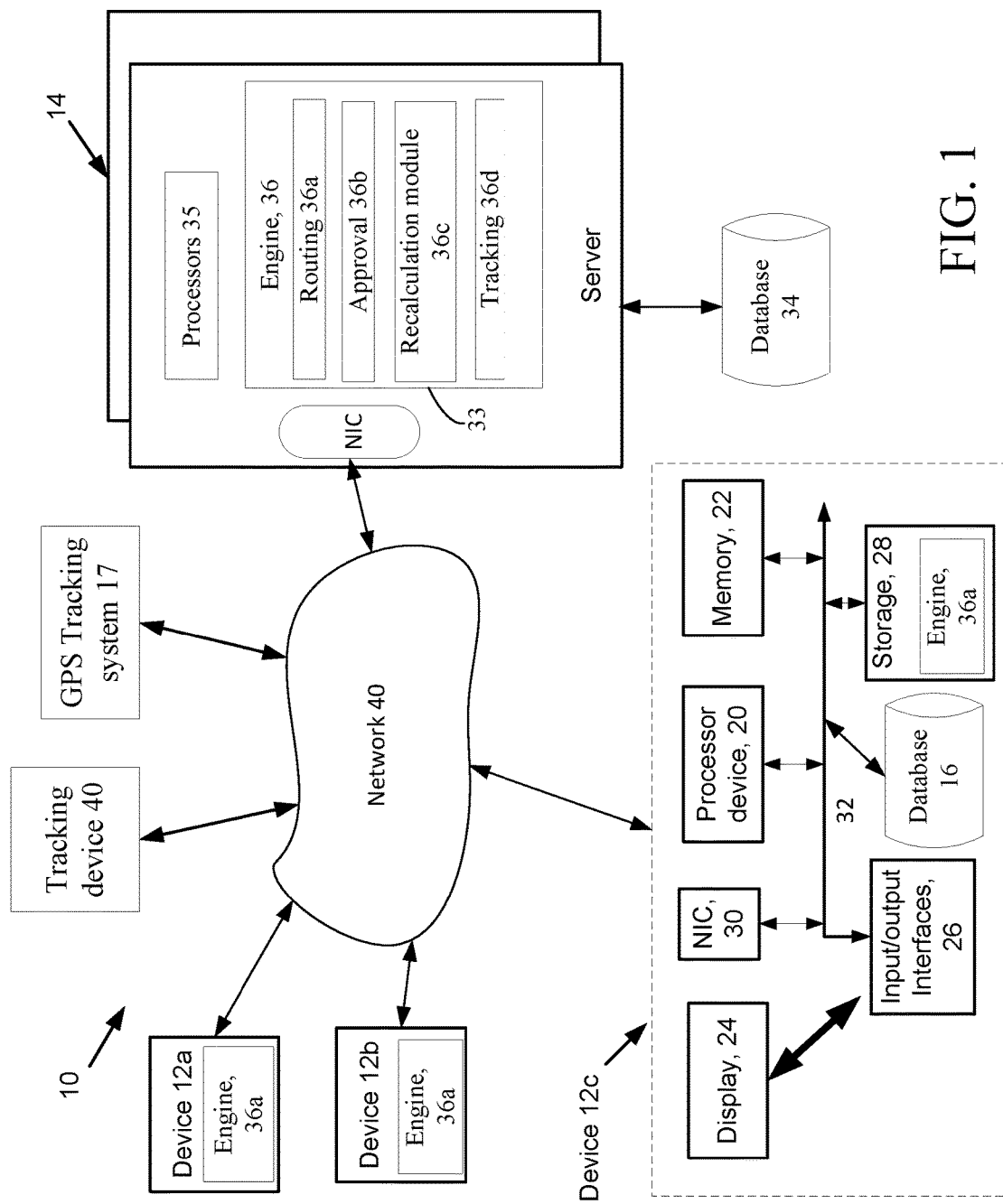
FIG. 1 is a block diagram of an exemplary navigation/tracking/authorization system.

Referring now to FIG. 1, a navigation/tracking/authorization system (NTA) system 10 includes a plurality of navigation units 12a-12c and one or more server computer systems 14. The navigation units 12a-12c and the server computer systems 14 are networked together via a wireless network. The navigation units 12a-12c are typical of units such as found in cars, portable devices, etc., and which can be modified as will be discussed below.

Figure 3:
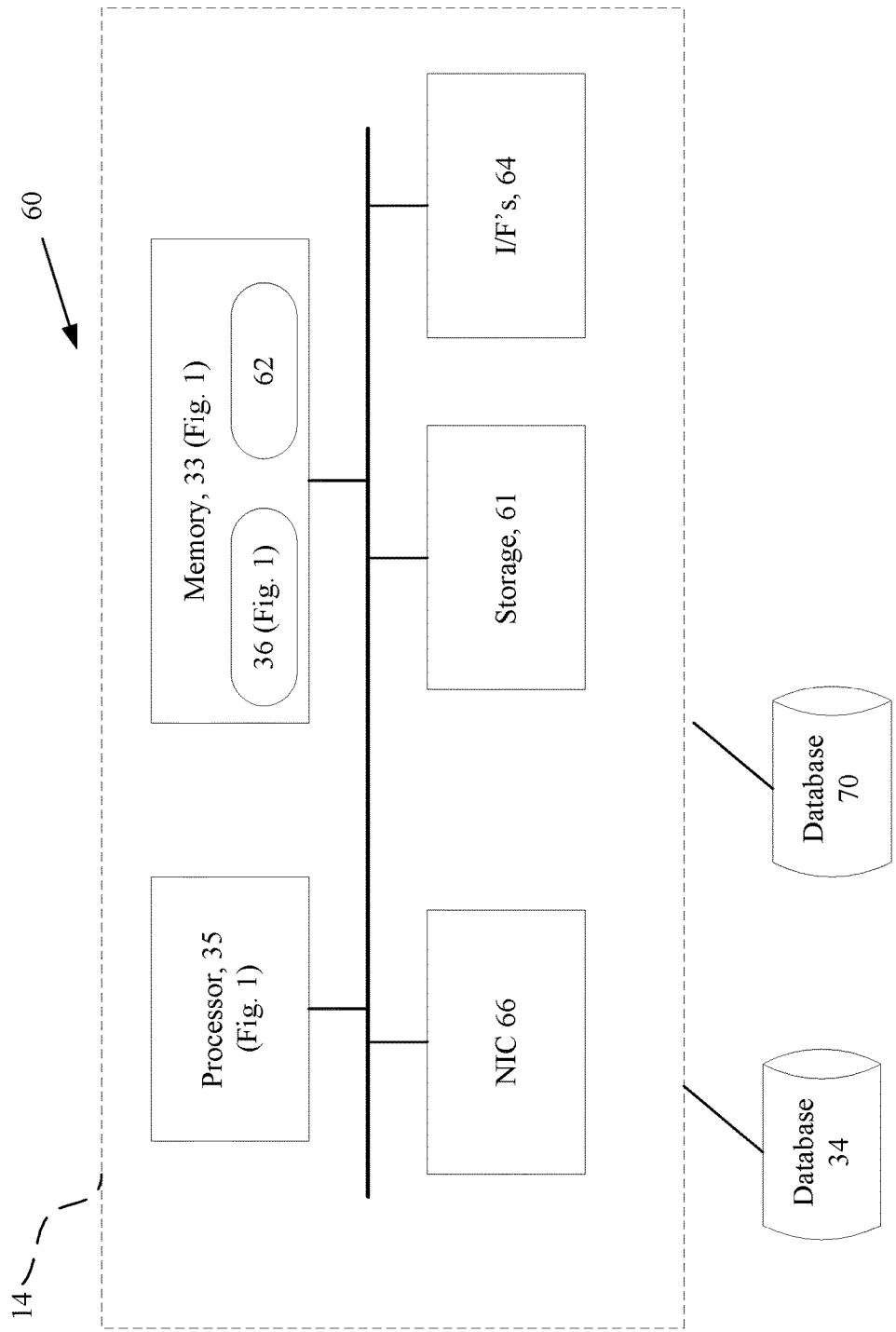
FIG. 3 is a block diagram of an exemplary offender location central monitoring facility.

In the context of a particular application of the NTA system 10, the server computer systems 14 approve and track and may generate routes for offenders when traveling in vehicles that are equipped with the navigation units 12a-12c. In addition in some implementations, the NTA system 10 can be part of a central monitoring system 60 as shown in FIG. 3. Such a central monitoring system 60 (or central repository as disclosed in U.S. Pat. No. 8,682,356 the entire contents of which are incorporated herein by reference) will track movements associated with the offender by receiving location data from tracking devices (generally 40). Also shown is a second set of tracking systems (generally 17) that are of a type that tracks and collects location data from the GPS navigation systems 12a-12c typified by commercial navigation services.

The navigation units 12a-12c include a processor device 20, memory, 22 a display 24, interfaces 26, a network interface 30 and a GPS transceiver 32. The navigation units 12a-12c also include a storage device that stores a runtime map database 16.

As used herein a map database is a computer readable, stored representation of road networks together with identifying features. Map databases are commonly provided by map providers that use various models with which to produce the map database. Generally, a model will use nodes to represent a point location, a link to present a path between nodes, and areas that represent shapes of items. Map providers supply map data in various formats, such as the Standard Interchange Format. However, this format is not well suited for use by a navigation unit during runtime. Consequently, various proprietary runtime formats are typically provided by manufacturers of the navigation units 12a-12c to provide the runtime map database 16.

Many navigation functions require auxiliary data that are not supplied as part of the map database provided by the map provider. The auxiliary data is cross-referenced with the entities and attributes of the map runtime database 16, using well-known techniques, in order to be used with the runtime database 16. However, since the auxiliary data is not necessarily compiled with the main database, to establish cross-referencing one of two common approaches such as function-specific referencing tables and generic referencing can be used.

Function-specific referencing tables provide a mechanism for attaching function-specific data to a map database. Such a table will have a list of map elements of a specific type (e.g., links, intersections, point-of-interest locations, etc.) along with identifying attributes (e.g., street names, longitude/latitude coordinates, etc.). After a table is formulated, each participating supplier determines and cross-references the elements in their map database to corresponding table entries. The generic referencing approach involves techniques to attach data to any map database by discovering reference information through a form of map matching and assigning function-specific data items to points (nodes), links and/or area map elements in a specific map database. Thus in one implementation the NTA system 10 can cause a download of a function specific table to the corresponding one of the navigation units 12a-12c, which function specific table includes representation of the list of restrictions that will be used by the corresponding one of the navigation units 12a-12c, as function specific data having values of nodes (plus values of restrictions about the node) for which the navigation unit would be restricted from using in segments of a route.

The NTA system 10 also includes a database 34 (or file) that stores a list of one or more location restrictions imposed on an individual, which list specifies for each restriction, a corresponding area or zone about the one or more location restrictions within which the individual is restricted from entering. One format for storing such lists would include values for longitude LO, latitude, LA (optionally altitude A) a range value, all of the foregoing being expressed in the particular GPS coordinates. Typically the database 34 will store many such lists for many such individuals that have legally imposed restrictions on their movements. In one implementation the database 34 is coupled to the server(s) 14, as shown.

For example, such a record can include an Offender ID, a name corresponding the location restriction, GPS coordinates (range) corresponding to the restriction, a distance restriction value and the GPS coordinate range (GPS coordinate (range) plus distance restriction value). Well-known techniques can be used to construct a range about a node, where the node is the center point and the range is represent by a radius about the center point. One GPS coordinate format to represent nodes and the radius is a decimal representation. Thus for a restricted area $A_R$ the range of points within the area are determined using a projection of an ellipse (generally 1 degree of LO would not necessarily equal 1 degree of LA) given by values of LO (longitude) and LA (latitude) for a radius r in feet (or other unit of measure) converted into a GPS coordinate format representation.

The servers 14 include processor device(s) 35, memory 33 coupled to the processor devices 35, and which stores an authorization/tracking engine 36 that can include portions implemented as computer program product. The engine 36 includes a routing module 36a that either receives from the navigation systems 12a-12c of respective individuals, one or more calculated route, between a user entered starting location and a destination location, which calculated routes are submitted to NTA system 10 for either automatic or manual approval. In an alternative embodiment a user submits a request for route determination via a webpage or other mechanism to the NTA system 10. In response to the request the NTA system 10 either causes a third party system to supply various calculated routes that are subsequently checked for compliance with the restrictions by the NTA system 10 or otherwise calculates such routes from the user sent starting and destination locations using the restrictions in the database 34 during calculation or to recheck proposed routes subsequent to calculation. The calculated routes would be specified in terms of respective formats of the runtime databases. One type of format is an ordered list of GPS locations, where latitude, longitude, and order (as well as altitude) are stored data items.

In either situation, either the routes calculated from the navigation systems 12a-12c or the routes calculated for the user by the servers 14 of NTA system 10 or are sent to an approval module 36b that retrieves from the database 34 those restrictions that are placed on the individual. The approval module 36b compare values of nodes corresponding to segments of the calculated routes between the starting location and the destination location to values of nodes corresponding to restrictions in the list. The approval module 36b determines from the comparison whether one or more segments of the proposed route violate one or more of the retrieved restrictions. When the approval module 36b determines a violation, the approval module 36b uses a recalculation module 36c that either generates a message to cause the navigation system to calculate a new route between the user-entered starting location and the destination location or causes the servers 14, via routing engine 36b, to calculate the new route. When the routes calculated for the user by the servers 14 of NTA system 10 taking into consideration restrictions, the routes can be determined by iteratively determining segments and for each segment determining whether the segment crosses a calculated restricted area.

The NTA system 10 issues an approval of one or more calculated routes when such routes do not violate the retrieved restrictions, storing the approval along with the route and notifying the offender either by sending a message to an offender's personal device, e.g., a smartphone and/or to the offender's particular one of navigation system 12a-12c.

In general, the route is represented as an ordered list of nodes. Line segments are constructed and from these constructed line segments that connects two nodes, the server 14 determines if any of the line segments between any two the nodes impinge on the calculated restricted area. If any of the line segments impinge on the calculated restricted area the calculated route is an invalid and thus a non-approved route. If the line that describes the travel (usually a roadway, but could be a trail if the participant is walking) intersects the restriction area (using a polygon intersection test) then we would flag this route as invalid.

The servers 14 upon initiation of travel by the individual, continually receive either location data collected by the navigation system and/or location data collected by the tracking device 40 affixed to the user. The servers 14 determine from the received location data whether a vehicle (not shown) that the user is being transported in has entered an area associated with the retrieved restrictions. When the servers 14 determine that the vehicle that the user is being transported in has entered an area associated with the retrieved restrictions, the servers issue an alert to a user device that the vehicle has entered an area associated with the retrieved restrictions and records occurrence of that violation. In some implementations, the servers 14 analyze the restrictions and send out other types of alerts depending on the types of restrictions.

The navigation system 12a-12c are typically automotive navigation systems. The NTA system 10 receives location data corresponding to locations of the automotive navigation system and determines from the received location data whether the vehicle is following the approved route. When the vehicle has deviated from the approved route, the NTA system 10 can issue alerts to the user device, to authorities systems, and to other user devices (such as third party device). In addition or alternatively, the servers 14 upon initiation of travel by the offender can receive location data collected from the tracking device 40 and determine from that set of location data whether the tracking device 40 and presumably the individual and vehicle have entered a retrieved restriction area have violated a retrieved restriction area or deviated from an approved route.

In other embodiments, the automotive navigation system is configured to receive the list of the one or more location restrictions, and calculate the one or more routes between the user-entered starting location and destination location where the routes avoid using segments that include nodes corresponding to areas in the list of one or more location restrictions.

Figure 2:
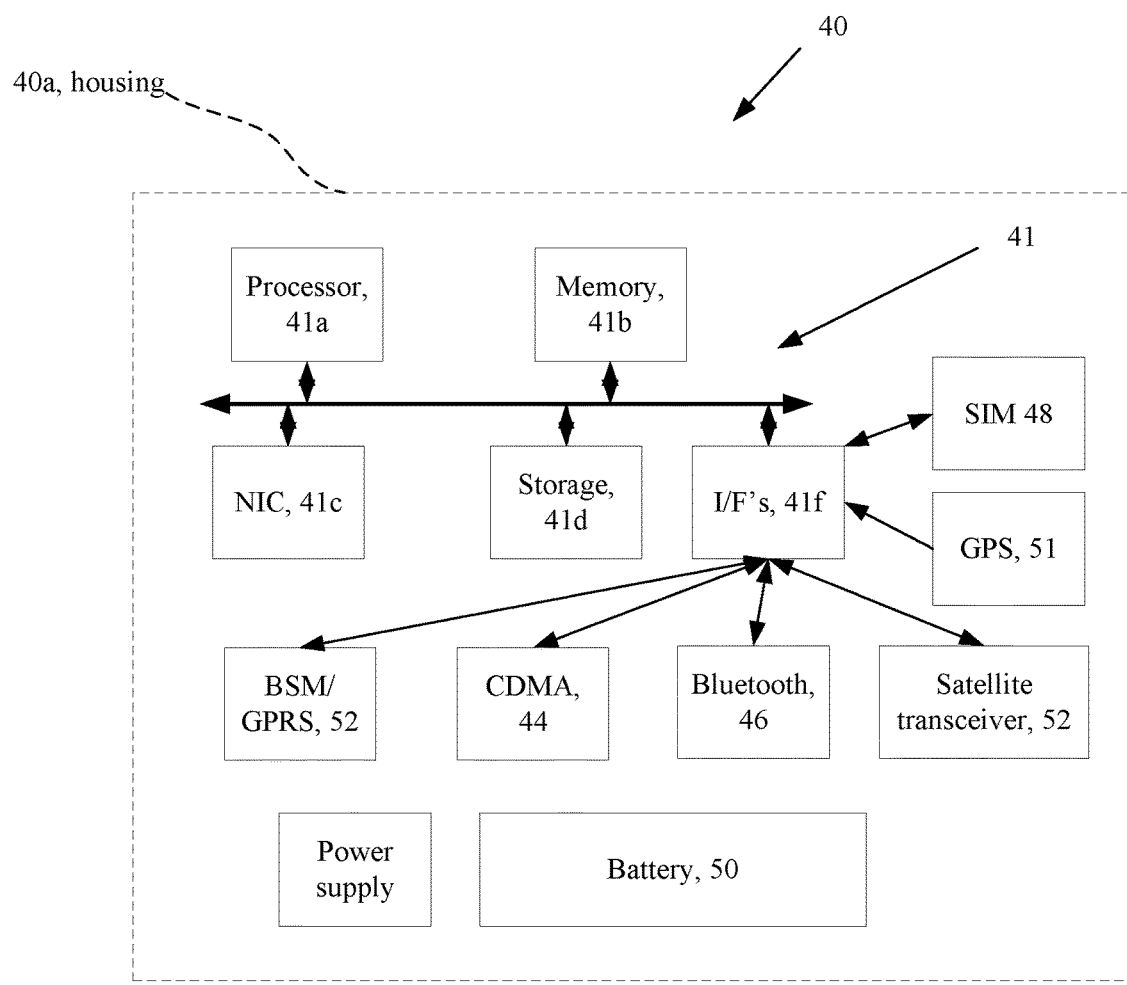
FIG. 2 is a block diagram of an exemplary portable tracking device.

Referring to FIG. 2, an embodiment of a tracking device 40 is shown. The tracking device 40 includes a housing 40a and processor module 41. The processor module 41 includes a processor 41a and memory 41b, storage 41d, and interfaces 41f. The processor module also can include a network interface 41c. The tracking device also includes mobile communication devices including a GSM/GPRS device 42, where GSM is the Global System for Mobile Communications standard developed by the European Telecommunications Standards Institute (ETSI) and GPRS is the General packet radio service standard that is a packet oriented mobile data service. Also included are a CDMA device 44, where CDMA is Code Division Multiple Access and a Bluetooth® transceiver 46 for peer to peer communications.

In addition, the tracking device 40 includes a Subscriber Identity Module (SIM) card 48, a battery 50, a location data collector configured to collect location data of the tracking device, such as a GPS (Global Positioning System) receiver 51, and a satellite transceiver 52. The tracking device 40 shown is exemplary. Other tracking devices that have but one communication mechanism could be used that is various configurations of tracking devices can include one or all the mobile communication devices 42 and 44 with or without the satellite transceiver 52. An exemplary device 40 is described in the above mentioned U.S. Pat. No. 8,682,356.

One particular implementation of device 40 is as an ankle bracelet monitor that is worn by the user, as mentioned in the above patent.

Referring now to FIG. 3, an exemplary high-level schematic of view of the server computers 14, as part of a central monitoring system 60, and which includes in addition to the server computer system(s) 14, database 34 and a database 70 is shown. In this implementation, the server computers 14 execute the engine 36 that approves, tracks and may generate routes for navigation devices 12a-12c, and also executes an engine 62 that tracks the device 40 (FIG. 2). The GPS receiver 51 on the device 40 (FIG. 2) collects GPS location data from satellites and the device 40, sends via one of the mobile communication devices 42, 44 such data to the server 14 system for storage in the database 70. The server computer system 14 includes the processor 35, memory 33 (and engine 36), as in FIG. 1, as well as storage 61, various interfaces (e.g., display, user interfaces, etc.) 64 a network interface 66 and can be of various configurations using various operating systems, etc. The collected GPS data are transmitted, e.g., via a cellular network or the like back to the server 14 that monitors locations of the device 40. The database 50 stores data in physical storage either locally or remotely. The database 50 can be accessed via systems on a network to either add to or retrieve from location data for a specific purpose.

In addition, in some implementations, the engine 36 collects GPS location data from a third party service system 17 such as systems associated with the navigation units 12a-12c or from the navigation units 12a-12c directly. The collected GPS data are transmitted to the server 14 that monitors locations of the device 40 and can use either or both sources of data to determine the offender's compliance with the approved routes taken by the user during transportation. The database 70 stores data in physical storage either locally or remotely. The database 70 can be accessed via systems on a network to either add to or retrieve from location data for a specific purpose.

Figures 3A, 3B:
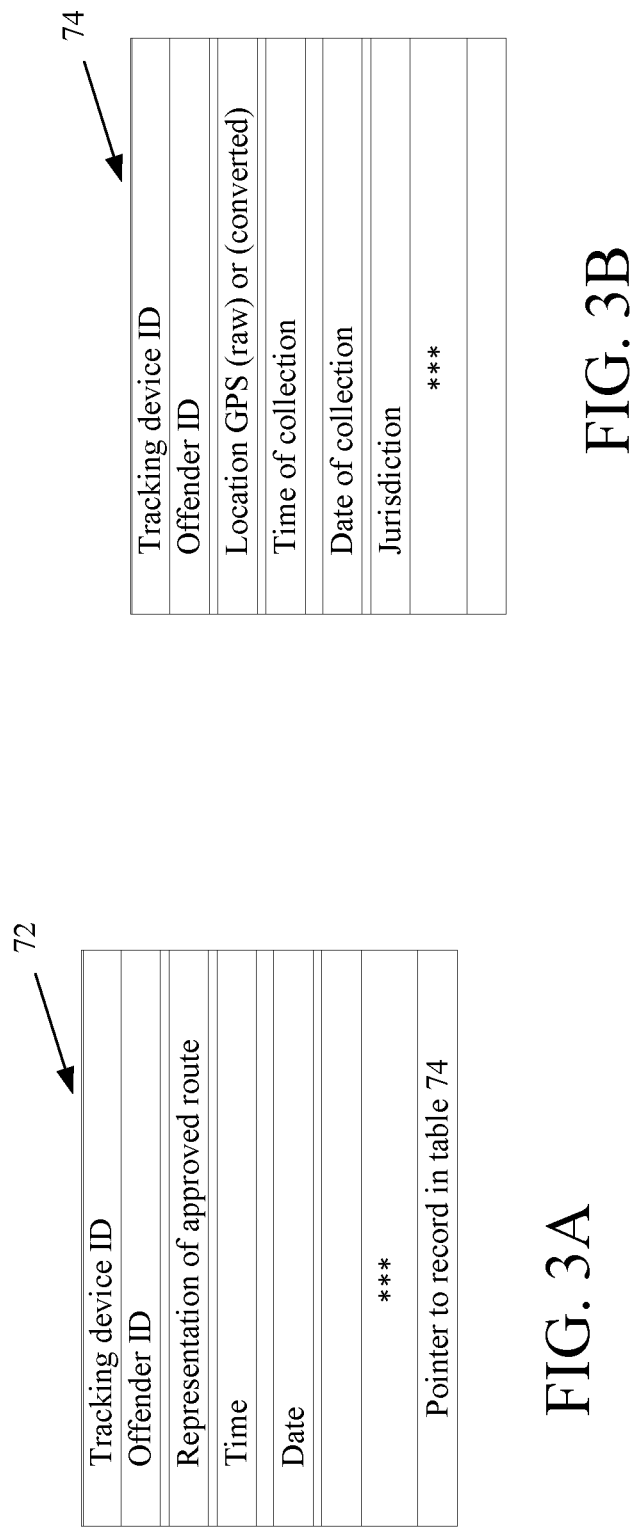
FIGS. 3A, 3B are block diagrams of exemplary block diagrams of records.

Referring to FIG. 3A, the database 34 stores one or more approved routes for an offender, as approved route records 72. Offender approved route records 72 comprise information particular to the offender that is being tracked by tracking device 40. An exemplary offender approved route record 72 can include some or all of fields as shown in FIG. 3A such as a field for storing a Tracking device ID (i.e., the ID of a device as in FIG. 1, which is assigned to a particular offender), a field for Offender ID (offender's name or other identifying item), fields that store a representation of a route requested by an offender and/or a representation of an approved route for the offender. Representations of the routes are stored as ordered lists of GPS locations. The fields can also include field for time of validity of the route, a field for date of validity, and a pointer to a tracking record in the database 50 for the offender.

Referring to FIG. 3B, the database 50 stores offender location tracking records 74. Offender location tracking records 74 comprise information particular to an offender that is being tracked by tracking device 40. For example, an exemplary offender location tracking record 74 can include some or all of fields as shown in FIG. 3A such as a field for storing a Tracking device ID (i.e., the ID of a device as in FIG. 1, which is assigned to a particular offender), a field for Offender ID (offender's name or other identifying item), a field for GPS location data (raw data or converted to geographic address information), a field for time of collection, a field for date of collection, a field for jurisdiction (agency responsible for offender) and so forth. The offender location tracking records 74 can be either raw records received from the tracking devices 40 or can be processed records including information as received from the tracking devices 40. The fields can also include field for a pointer to a tracking record in the database 34 for the offender.

Figure 4:
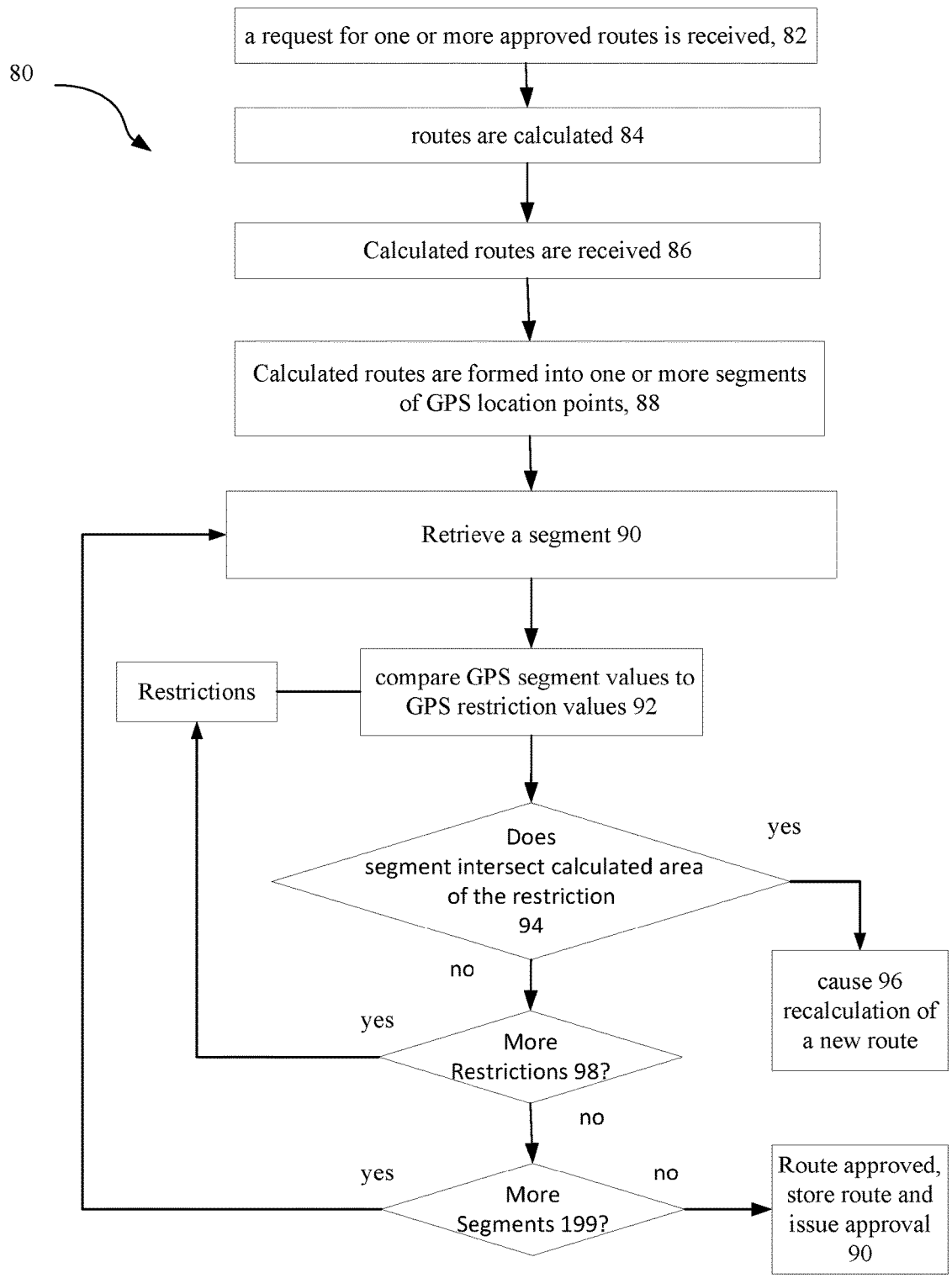
FIG. 4 is a flow chart of a route approval process.

Referring now to FIG. 4, a route approval process 80 is shown. The route approval process will be explained in the context of vehicle travel but applies equally well to a user walking and/or a mix of vehicle/walking travel. A user requests 82 one or more approved routes to be determined and/or approved for offender travel between a starting location and a destination location. This request can be received in various manners, such as by a telephone call to a central monitoring facility or by entering a route request via a web interface, which is sent to the central monitoring facility or directly to the route approval process 80. Also, the request can be in the form of a route that is calculated by the navigation system 12a or calculated for the user by the servers 14 (or other third party services).

In response to the request (or accompanying the request where a user device, e.g., navigation system 12a has calculated the route) one or more routes are calculated 84, by the servers 14 or by third party systems (not shown). The calculated routes are received 86 in a defined format such as in ordered lists of GPS locations. The lists can be per route or several lists can comprise a route.

The servers 14 execute the approval process 80 for approving those route(s) by forming 88 from the lists of GPS locations line segments (or segments) bounded by two GPS points from the list. A first segment is retrieved 90 and the approval process 80 compares 92 the calculated area corresponding to a first restriction to the segment. As used herein a node is a set of coordinates that correspond to a point in physical space (longitude, latitude and altitude, but generally altitude is not considered) and a segment contains plural nodes as an ordered listing describing a path. For example, the servers 14 compare geo-coordinate values of nodes corresponding to the segment to geo-coordinate values corresponding to the restriction to determine from the comparison whether any portion of the segment of the route intersects 94 the area that defines the retrieved restriction. If any portion of the segment of the route intersects the area that defines the retrieved restriction the approval process 80 causes 96 a recalculation of the route either by module 36c (FIG. 1) generating a message to cause the navigation system 12 to calculate a new route between the user entered starting location and the destination location or causes the servers 14, via routing engine 36b, to calculate the new route or causes the third party service to calculate a new route.

If the segment of the route does not intersect the area that defines the retrieved restriction the approval process 80 determines if there are more restrictions 98 and if so gets the next restriction to compare 92. If there are no more restrictions, the approval process 80 determines if there are more segments, if so gets the next segment to compare 92. If there are no more segments and the process has not otherwise exited by causing a recalculation of a new route, the NTA system 10 issues 99 an approval of the route, stores the approval along with the route and notifies the offender either by sending a message to an offender's personal device, e.g., a smartphone and/or to the offender's particular one of navigation system 12a.

For each restriction in the database there exists a set of geo-coordinates (or a range of geo-coordinates as determined above). These restrictions will correspond to physical locations that in most cases will be a physical premises such a building. Generally, restrictions will also include a distance value. Thus, a restriction could be as follows:

Offender X cannot be within 500' of a school

Offender X cannot be within 1000' of 29 Main St. New City, Ala. (fictitious address)

In the comparison with respect to "the 29 Main St . . . " address, the address is represented either by a single geo-coordinate (a node) or by a range of geo-coordinates. To either the single geo-coordinate (waypoint) of the address or the range of geo-coordinates representations, a value of distance (expressed in geo-coordinates) is added as (an elliptical projection of a circle) so as to produce a range expressed in geo-coordinates (represented, e.g. as a circle), which establishes a restricted area. Other shapes could be used such as rectangles and squares, but an elliptical projection as a circle (due to curvature) is the more common. The value that is added can be increased when a single geo-coordinate, rather than range is used as the location. Perimeter nodes about the address can also be used. An area about the node can be represented and or determined as a restriction area defined by a center point and a radius or by an ordered set of GPS locations that define a closed polygon. The ordered set of GPS locations can also have a value assigned that adds a buffer around the defined area.

In the comparison with respect to "a school," either the database can contain all locations of schools within an area about which the offender is authorized for travel or the approval process 80 can access other external resources for locations of schools in the area. The locations of schools are stored and thereafter processing is similar to the 29 Main St address processing above. School(s) are represented either by a single geo-coordinate (a center point) of the address or by a range of geo-coordinates or set of perimeter points. To either the single geo-coordinate (center point) of the address or the range of geo-coordinates representations or perimeter points, a value of distance (expressed in geo-coordinates) is added so as to produce a range expressed in geo-coordinates, which establishes a restricted area about each of the schools in the list. The value that is added can be increased when the single geo-coordinate, rather than range is used.

In other embodiments, the automotive navigation system is configured to receive the list of the one or more location restrictions, and calculate the one or more routes between the user-entered starting location and destination location where the routes avoid using segments that include nodes corresponding to areas in the list of one or more location restrictions.

Figure 5:
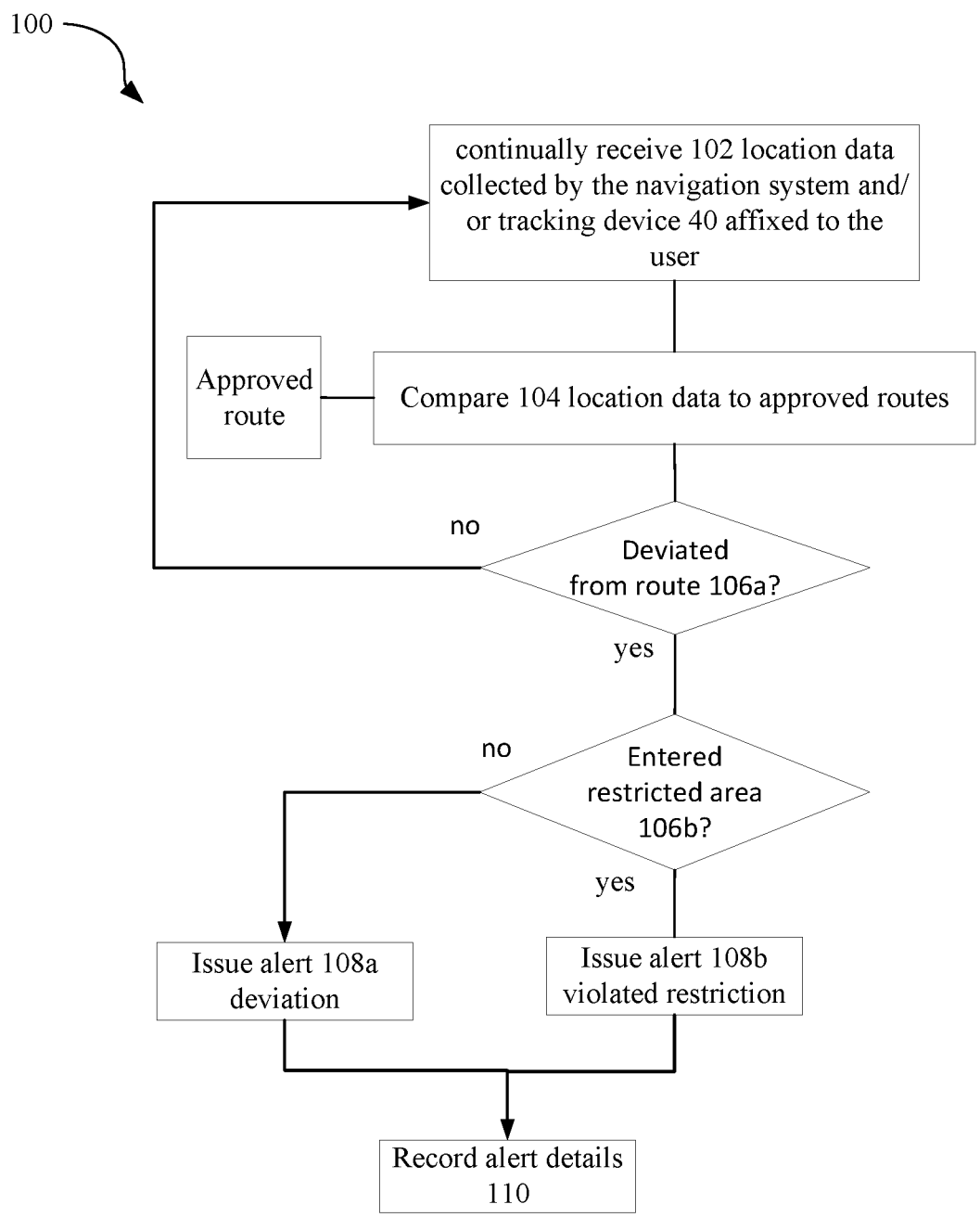
FIG. 5 is flow chart for tracking of individuals to adhere to approved routes.

Referring now to FIG. 5, tracking processing 100 has the servers 14 track the location of an individual during vehicle modes of travel (car, bus, etc.), rather than merely tracking movements of an individual outside of travel (e.g., walking, or being at a fixed location). Upon initiation of travel by the individual, e.g., by using a vehicle, the servers 14 continually receive 102 either location data collected by the navigation system 12*a* (and/or in some instances location data collected by the tracking device 40 affixed to the user). In some implementations such tracking data are received from GPS tracking systems 17 associated with third party services. The servers 14 access the approved route and the servers 14 compare location data to approved route(s) to determine whether the offender's vehicle remains on an approved route. From this comparison, the servers can determine 106*a* whether the user has deviated from the approved route and also the servers determine 106*b* whether the user has violated a restriction (e.g., entered a restricted area). This tracking process 100 likewise applies when the offender is walking, as the tracking would be accomplished using data collected from the tracking device 40 affixed to the user.

When the servers 14 determine 106*a* that the vehicle has deviated from the approved route, but has not entered an area associated with the retrieved restrictions, the servers 14 can generate 108*a* an alert indicating the deviation. In that instance, the servers 14 rather than issuing an alert to notify the authorities that the vehicle has entered an area associated with the retrieved restrictions, the servers 14 could merely record occurrence of that deviation and generate the alert 108*a* that is sent to the offender's user device, e.g., a smart phone or the navigation system 12*a* and/or tracking device 40 used by the offender, and record 110 the alert details.

When the servers 14 determine 106 that the vehicle has entered an area associated with the retrieved restrictions, the servers 14 can immediately issue 108*b* an alert to a user device (and to authorities as well as other user devices for whose benefit the restriction is in place see for instance the above incorporated by reference US patent) that the vehicle has entered an area associated with the retrieved restrictions and records occurrence of that violation. If the servers 14 determine that the user has violated or is close to (based on a predefined tolerance) violating any of the retrieved restrictions, the servers 14 can in addition to sending the alert 108*a* to the offenders user device, e.g., a smart phone or the navigation system and/or tracking device 40, send 108*b* the alert to the authorities, with the user's current location, and record 110 the alert details.

The comparison process 108*a* executed by the servers 14 determine whether the user is/has violated (or is/was close to violating but otherwise has not violated) any of the retrieved restrictions, by comparing a current node of travel as received from the navigation system and/or tracking device 40 to one or more ranges of geo-coordinates associated with the restrictions similar to the comparison 88 performed by the approval process 80 (FIG. 4) but instead compares GPS data to from the navigation device or tracking device to the calculated areas that define the restricted areas.

Initially GPS data is collected from satellites orbiting the earth by the GPS chip 51 in the tracking device 40. The collected data is stored locally on the tracking device 40 that collected the GPS data. In some embodiments, the tracking device 40 will attempt to analyze the data and send results of analysis on the collected GPS data to the central monitoring system 60 for storage in the database 70, whereas in other embodiments, the tracking device 40 will attempt to establish communication with the central monitoring system 60 via a cellular and/or satellite network and send the data to the central monitoring system 60 where the server computers 14 will analyze the data. The tracking device 40 can also maintain a local store of the location data along with time/date, etc. Various mechanisms for establishing connections are disclosed in the above Issued patent. Once the connection is acquired, the tracking device 40 will send the collected and/or results of analysis on the collected GPS data to the server computers 14 at the central monitoring system 60.

The central monitoring system 60 includes the server computers 14 in communication with the device of FIG. 1, and at least one transceiver configured to receive location data from plural remote devices. The server computers 14 comprising processor and memory can be configured to retrieve a set of location data corresponding to the tracking device 40 and apply a process to the set of location data to determine from data points in the set whether a point corresponds to a defined or known area. The database 50 is configured to store the location data according to an identification of the device of FIG. 1, e.g., using the SIM module and/or other approaches.

The analysis processes 80 and 100 are typically executed by the server computers 14 in the central monitoring system 60, but in some embodiments can be executed by other systems (e.g., client devices and the like) under control of authorities that are monitoring the user of the tracking device 40. For a first offender, the central monitoring system 60 receives 62 on a periodic and/or continuous basis tracking data for the first offender. Similarly, the NTS system 10 receives periodically request for approval of routes for travel. Such data for the first offender includes GPS location data as well as time and date data specifying the time and the date on which the first data was collected. This data, e.g., the GPS location data and time/date of collect data are stored 64 in the database 50 for the first offender. The central monitoring system 60 receives on a periodic and/or continuous basis 66 offender tracking data from many other similarly tracked offenders. As with the data for the first offender, such data includes GPS location data as well as the time and date that the data were collected. These other GPS location data and time/date of collect data are stored in the database 50 for each of the other tracked offenders. Using tracking devices 40 described above, which capture location and time/date data, such data are sent to the central monitoring system 60 via either the cellular or satellite communication channels. In some implementations, using the tracking device 40, the tracking devices can capture data from proximate Bluetooth transceivers on such tracking devices 40 and send this data to the central monitoring system 60 via either the cellular or satellite communication channels.

Server computers 14 can be any of a variety of computing devices capable of receiving information, such as a server computers, a distributed computing system, a desktop computer, a laptop, a cell phone, a rack-mounted server computers, and so forth. Server computers 14 may be a single server computers or a group of server computers that are at a same location or at different locations.

Server computers 14 can receive information from client device user device via interfaces. Interfaces can be any type of interface capable of receiving information over a network, such as an Ethernet interface, a wireless networking interface, a fiber-optic networking interface, a modem, and so forth. Server computers 14 also includes a processor and memory. A bus system (not shown), including, for example, a data bus and a motherboard, can be used to establish and to control data communication between the components of server computers 14.

Processors may include one or more microprocessors. Generally, a processor may include any appropriate processor and/or logic that is capable of receiving and storing data, and of communicating over a network (not shown). Storage can include a hard drive and a memory whether volatile or non-volatile random access memory devices, such as a dynamic random access memory, and machine-readable media or other types of storage which are non-transitory machine-readable storage devices. Components also include a storage device, which is configured to store information, code, etc.

Embodiments can be implemented in digital electronic circuitry, or in computer hardware, firmware, software, or in combinations thereof. Embodiments can also involve pipelining of various computational stages. Apparatus of the invention can be implemented in a computer program product tangibly embodied or stored in a machine-readable storage device and/or machine readable media for execution by a programmable processor; and method actions can be performed by a programmable processor executing a program of instructions to perform functions and operations of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention. Accordingly, other embodiments are within the scope of the following claims.

What is claimed is:

1. A navigation tracking and authorization system comprises:
    a processor device;
    memory coupled to the processor device; and
    a storage device storing location restriction data and a computer program product for determining whether a route will include a segment that would fall within a restricted area, the storage device comprising instructions to configure the navigation tracking and authorization system to:
        receive from a computer based navigation device one or more calculated routes between a user entered starting location and a destination location;
        retrieve for a given individual, location restriction data from the storage device, with the location restriction data comprising for each of at least one restriction imposed on the given individual, geo coordinate data that define at least one area on which the at least one restriction is imposed on the individual;
        compare values of geo coordinates corresponding to segments of the one or more calculated routes to values of the geo coordinates corresponding to the at least one area defined by the geo coordinates corresponding to the one or more restrictions;
        determine from the comparison whether one or more segments of the proposed route intersect one or more of the areas defining the restrictions;
        cause the computer based system to calculate a new route between the user entered starting location and the destination location when an intersection is determined; and
        forward the new route to the navigation device.

2. The system of claim 1 wherein the system is further configured to:
   issue an approval of one or more calculated routes when the segments of the corresponding one or more calculated routes do not intersect areas defining all of the restrictions.

3. The system of claim 1 wherein the one or more calculated routes are received as an ordered listing of nodes.

4. The system of claim 3 wherein the system is further configured to:
   produce the segments from the one or more calculated routes represented as the ordered listing of nodes.

5. The system of claim 1 wherein the system is a central server system that tracks user movement stores location restrictions imposed on individuals, with the location restrictions defining one or more areas about the location restrictions within which the individuals are restricted from entering, with the system further configured to:
   receive from the navigation device a user request for approval of the one or more calculated routes.

6. The system of claim 5 wherein the system receives the user request, and the system is configured to:
   send a system generated request to a third party system for calculation of a route between the user entered starting location and a destination location.

7. The system of claim 6 wherein the system receives the calculated route from the third party system, and the system is configured to:
   send a second request to the third party system for the recalculation of a route between the user entered starting location and a destination location when the received calculated route is determined to have one or more segments that intersect one or more of the areas.

8. The system of claim 7 wherein the system receives from a user device a calculated route that accompanies the user request for approval of the calculated route; and the system is configured to:
   send the approval to the user device when the system determines that the received calculated route does not have at least one segment that intersects one or more of the areas.

9. The system of claim 5 wherein the system receives a calculated route that accompanies the user request for approval of the calculated route; and the system is configured to:
   send a message to the user device to calculate a new route when the system determines that the received calculated route does have at least one segment that intersects one or more of the areas.

10. The system of claim 5 wherein the system receives a calculated route that accompanies the user request for approval of the calculated route; and the system is configured to:
    calculate an alternative route by the system, which route is determined to be free of any segments that intersect one or more of the areas.

11. The system of claim 1 wherein upon initiating of travel by the individual in a vehicle, the system is further configured to:
    receive from a navigation system in the vehicle, location data collected by the navigation system;
    determine from the location data whether the user has entered an area associated with the retrieved restrictions; and
    issue an alert to a user portable tracking device that the vehicle has either deviated from the approved route and/or entered an area associated with the retrieved restrictions.

12. The system of claim 1 wherein the navigation device is an automotive navigation system.

13. The system of claim 1 wherein upon initiating of travel by the individual, the system is further configured to:
    receive location data collected by a location data collector associated with the tracking device;
    determine from the set of location data whether the tracking device has entered an area associated with the retrieved restrictions; and
    issue an alert to a user device that the user has either deviated from the approved route and/or entered an area associated with the retrieved restrictions.

14. The system of claim 1 wherein the storage stores a list of the one or more location restrictions that are imposed on an individual, the list specifying for each restriction, the corresponding area about the location restriction within which the individual is restricted from entering, and with the system further configured to:
    receive the list of the one or more location restrictions, with the list comprising a node expressed in geo coordinates of longitude and latitude and an radius about the node; and
    calculate for each of the one or more location restrictions from the geo coordinates of longitude and latitude and corresponding radius about the node, the area that defines the location restriction; and
    store the calculated area in association with the restriction.

15. A system comprises:
    a storage device that stores records for a plurality of individuals at least some of those records having associated records corresponding to one or more location restrictions imposed on at least some of the plurality of individuals, with each restriction including geo location data defining a restriction area;
    a processor device and memory coupled to the processor device; and
    a storage device storing a computer program product for determining whether a route will include a segment that would fall within a restricted area, the storage device comprising instructions that for an individual of the plurality of individuals, configure the system to:
    receive from a computer based device a request for calculation of one or more routes between starting location and a destination location;
    send the request for calculation of one or more routes between the starting location and the destination location to a navigation service;
    receive one or more calculated routes from the navigation service;
    retrieve from the storage device one or more location restrictions imposed on the individual;
    determine from geo coordinates corresponding to segments of the one or more calculated routes whether one or more of the segments intersect the one or more restriction areas associated with the individual;
    issue an approval for each route where no segment of the route intersects any of the restriction areas;
    receive from a navigation device upon initiating of travel by the individual, location data collected by the navigation device;
    determine from the location data whether the user has deviated from the one or more approved routes; and issue an alert to a user device that the navigation device has either deviated from the approved route and/or entered an area associated with the retrieved restrictions.

16. A method comprises:

receiving by a navigation approval tracking system, a request to approve a route for travel for a user having travel restrictions;

receiving by the navigation approval tracking system one or more calculated routes between a starting location and a destination location;

retrieving from a storage device for the user having the travel restrictions, a list of one or more location restrictions, with the list specifying for each restriction a corresponding restriction area about a corresponding location included in the restriction;

comparing by the navigation approval tracking system location coordinate values of nodes corresponding to segments of the one or more calculated routes to location coordinate values of a restriction area corresponding to one of the one or more restrictions; and determining by the navigation approval tracking system from the comparison whether one or more of the segments intersect the area; and when an intersection is determined, causing by the navigation approval tracking system a calculation of a new route between the starting location and the destination location.

17. The method of claim 16 further comprising:

sending by the navigation approval tracking system, an approval message to a user device, when the navigation approval tracking system determines that for one or more of the calculated routes there are no intersections.

18. The method of claim 16 wherein receiving by the navigation approval tracking system of the one or more calculated routes further comprises:

generating by the navigation approval tracking system the one or more calculated routes between the user entered starting location and the destination location.

19. The method of claim 16 wherein the one or more calculated routes received by the navigation approval tracking system are received from a navigation system.

20. The method of claim 16 wherein upon initiating of travel, the method further comprises:

receiving by the navigation approval tracking system location data collected by a tracking the navigation system;

determining by the navigation approval tracking system from the location data whether the user has entered a restricted area; and issuing by the navigation approval tracking system an alert to a user device when the user entered the restricted area.

21. The method of claim 20 wherein the tracking system is an automotive navigation system.

22. The method of claim 20 wherein the tracking system is an offender tracking device.

* * * * *